United States Patent
Fitzgerald et al.

(10) Patent No.: US 8,588,582 B2
(45) Date of Patent: Nov. 19, 2013

(54) SYSTEM AND METHOD FOR ON-DEMAND STORAGE OF RANDOMLY SELECTED DATA

(76) Inventors: Diana Lynn Fitzgerald, Los Angeles, CA (US); David Charles Isaacson, Columbia, MD (US)

(*) Notice: Subject to any disclaimer, the term of this patent is extended or adjusted under 35 U.S.C. 154(b) by 1057 days.

(21) Appl. No.: 10/713,143

(22) Filed: Nov. 17, 2003

(65) Prior Publication Data

US 2005/0120858 A1 Jun. 9, 2005

(51) Int. Cl.
*H04N 9/80* (2006.01)
*G11B 27/10* (2006.01)

(52) U.S. Cl.
CPC .................... *G11B 27/105* (2013.01)
USPC ............ 386/241; 725/50; 715/748; 705/26.1; 709/219; 455/426.1

(58) Field of Classification Search
CPC ................ G11B 27/105; H04N 5/85
USPC .......... 386/124, 200, 239, 241; 715/744–748; 725/50, 51; 705/26.1, 27.1; 709/219, 709/223; 455/66.1, 186.1, 414.3, 418, 455/426.1
See application file for complete search history.

(56) References Cited

U.S. PATENT DOCUMENTS

| | | |
|---|---|---|
| 4,430,676 A | 2/1984 | Johnson |
| 4,499,601 A | 2/1985 | Matthews |
| 4,682,370 A | 7/1987 | Matthews |
| 4,788,675 A | 11/1988 | Jones et al. |
| 5,262,940 A | 11/1993 | Sussman |
| 5,345,430 A * | 9/1994 | Moe .................................. 369/7 |
| 5,371,532 A * | 12/1994 | Gelman et al. ................... 725/88 |
| 5,399,799 A | 3/1995 | Gabriel |
| 5,490,125 A | 2/1996 | Takada et al. |
| 5,661,787 A | 8/1997 | Pocock |
| 5,703,795 A | 12/1997 | Mankovitz |
| 5,732,324 A | 3/1998 | Rieger, III |
| 5,742,893 A | 4/1998 | Frank |
| 5,809,246 A * | 9/1998 | Goldman ...................... 709/217 |
| 5,862,104 A | 1/1999 | Matsumoto |
| 5,907,815 A | 5/1999 | Grimm et al. |
| 5,931,901 A | 8/1999 | Wolfe et al. |
| 5,949,492 A | 9/1999 | Mankovitz |

(Continued)

OTHER PUBLICATIONS

Audiovox—Sirius Shuttle User Guide SIR-PNP2, Oct. 2003.

(Continued)

*Primary Examiner* — Thai Tran
*Assistant Examiner* — Mishawn Dunn
(74) *Attorney, Agent, or Firm* — Isaacson, David C.

(57) ABSTRACT

A data storage system allows a subscriber to store data at the time the subscriber experiences the date with an indication, such as a press of a button or a voice command. The indication causes a request to obtain and store the data to be issued. For example, the subscriber can store music while listening to it, store movies while viewing them, or store movie soundtracks while viewing movies. The entire music file can be stored, for example, in a vehicle in which the subscriber is traveling. For some environments, such as storage in a cellular telephone, a portion of the music is stored in a format compatible for that environment, such as cellular telephone ring tone format. When the indication is received, a determination is made as to which music is required, generally by determining the time of the indication. The music heard by the listener is then downloaded for storage in accordance with the subscriber's request.

20 Claims, 9 Drawing Sheets

(56) References Cited

U.S. PATENT DOCUMENTS

| | | | |
|---|---|---|---|
| 6,041,023 A | 3/2000 | Lakhansingh | |
| 6,067,278 A | 5/2000 | Owens et al. | |
| 6,072,645 A * | 6/2000 | Sprague | 360/5 |
| 6,163,508 A | 12/2000 | Kim | |
| 6,192,372 B1 | 2/2001 | Yamaura et al. | |
| 6,209,787 B1 | 4/2001 | Iida | |
| 6,233,389 B1 | 5/2001 | Barton et al. | |
| 6,233,682 B1 | 5/2001 | Fritsch | |
| 6,246,672 B1 | 6/2001 | Lumelsky | |
| 6,247,130 B1 | 6/2001 | Fritsch | |
| 6,263,147 B1 * | 7/2001 | Tognazzini | 386/298 |
| 6,434,535 B1 | 8/2002 | Kupka et al. | |
| 6,437,227 B1 * | 8/2002 | Theimer | 84/609 |
| 6,516,466 B1 | 2/2003 | Jackson | |
| 6,529,584 B1 | 3/2003 | Ravago et al. | |
| 6,567,359 B2 | 5/2003 | McPherson et al. | |
| 6,587,127 B1 | 7/2003 | Leeke et al. | |
| 6,587,837 B1 * | 7/2003 | Spagna et al. | 705/26 |
| 6,625,444 B1 | 9/2003 | Fleming, III et al. | |
| 6,640,145 B2 | 10/2003 | Hoffberg et al. | |
| 6,674,960 B2 | 1/2004 | Duran et al. | |
| 6,678,215 B1 | 1/2004 | Treyz et al. | |
| 6,701,355 B1 | 3/2004 | Brandt et al. | |
| 6,757,913 B2 | 6/2004 | Knox | |
| 6,937,732 B2 | 8/2005 | Ohmura et al. | |
| 6,941,275 B1 * | 9/2005 | Swierczek | 705/26.61 |
| 6,959,419 B2 * | 10/2005 | Taniwaki | 715/716 |
| 7,014,484 B2 * | 3/2006 | Hagiwara | 439/159 |
| 7,093,754 B2 * | 8/2006 | Sako | 235/385 |
| 7,113,739 B2 | 9/2006 | Kawamata et al. | |
| 7,113,927 B1 * | 9/2006 | Tanaka et al. | 705/56 |
| 7,227,071 B2 | 6/2007 | Tagawa et al. | |
| 7,233,658 B2 * | 6/2007 | Koser et al. | 379/373.01 |
| 7,257,536 B1 | 8/2007 | Finley et al. | 704/270 |
| 7,263,280 B2 * | 8/2007 | Bullock et al. | 386/241 |
| 7,343,179 B1 * | 3/2008 | Theis et al. | 455/567 |
| 7,356,557 B2 * | 4/2008 | Kikuchi et al. | 709/201 |
| 7,424,446 B2 | 9/2008 | Emodi et al. | |
| 7,444,353 B1 * | 10/2008 | Chen et al. | 707/104.1 |
| 7,450,971 B2 | 11/2008 | Futohashi | |
| 2001/0000808 A1 * | 5/2001 | Lesley | 705/39 |
| 2002/0007354 A1 * | 1/2002 | Deguchi | 705/418 |
| 2002/0074413 A1 * | 6/2002 | Henzerling | 235/492 |
| 2002/0174431 A1 * | 11/2002 | Bowman et al. | 725/47 |
| 2002/0198789 A1 * | 12/2002 | Waldman | 705/26 |
| 2003/0037124 A1 * | 2/2003 | Yamaura et al. | 709/219 |
| 2003/0044021 A1 * | 3/2003 | Wilkinson et al. | 381/56 |
| 2003/0109251 A1 * | 6/2003 | Fujito et al. | 455/414 |
| 2003/0199268 A1 * | 10/2003 | Abe | 455/419 |
| 2004/0011190 A1 * | 1/2004 | Kawashima | 84/645 |
| 2004/0086120 A1 * | 5/2004 | Akins et al. | 380/240 |
| 2004/0092295 A1 * | 5/2004 | Yamada | 455/567 |
| 2004/0100492 A1 * | 5/2004 | Mercs | 345/744 |
| 2004/0203406 A1 * | 10/2004 | Moran et al. | 455/66.1 |
| 2005/0031314 A1 * | 2/2005 | Galdos | 386/117 |
| 2005/0219068 A1 * | 10/2005 | Jones et al. | 341/50 |
| 2006/0003753 A1 * | 1/2006 | Baxter, Jr. | 455/414.3 |
| 2006/0259375 A1 * | 11/2006 | Deguchi | 705/27 |
| 2007/0043847 A1 * | 2/2007 | Carter et al. | 709/223 |
| 2007/0177586 A1 * | 8/2007 | Eyal et al. | 370/352 |
| 2008/0060504 A1 * | 3/2008 | Oshiyama et al. | 84/609 |

OTHER PUBLICATIONS www.audiovox.com/pressrelease/AEC/release__AEC__2004010922.html, "Audiovox Car and Home Sirius Satellite Radio System Scores Big with Retailers and Consumers," Jan. 9, 2004.
www.ericsson.com/ericsson/press/releases/old/archive/2000Q2/20000605-0007.html, "Ericsson Unveils First GPRS Phone with Bluetooth(tm)—the R520," Jun. 5, 2000.
Markoff, John, www.nytimes.com/library/tech/98/12/biztech/articles/21time.html, "FCC Mulss Wider Commercial Use of Radical Radio Technology," Dec. 21, 1998.
Dorman, Andy, "Emerging Technology" Are We Better Off Without 3G?, Jun. 3, 2003.
Kong, Rich, et al., "Mobile Data Access: Disconnected and Partially Connected Approaches," Mar. 5, 2001.
Reilly, Darrin, www.motorola.com/LMPS/articles/polchief.html, "Making the Choice Among Private, Public or Integrated Networks for . . . Data Communications," Sep. 1997.
Layer, David, "Digital Radio Takes to the Road," *IEEE Spectrum*, pp. 40-46, Jul. 2001.
Mitola, Joe, "The Software Radio Architecture," *IEEE Communications Magazine*, pp. 26-38, May 1995.
Product Review, "Sony MEX-1HD," T3 issue 80, Christmas 2002.
Product Advertisement, Delphi SA 10000 XM SKYFi Radio Receiver, copyright 2003.
Product Advertisement, Echo Mobile Music, Music Keeper(TM).
Mossberg, Walter S., "Attack of the iPod Clones," The Wall Street Journal, pp. D1 and D4, Oct. 29, 2003.
Griffin Technology RadioShark product manual, May 2004.
Tivo Viewer's Guide, Nov. 2002.
Office Action dated Jun. 30, 2009 in U.S. Appl. No. 11/128,324.
Office Action dated Mar. 31, 2010 in U.S. Appl. No. 11/128,324.

* cited by examiner

SYSTEM AND METHOD FOR ON-DEMAND STORAGE OF RANDOMLY SELECTED DATA

BACKGROUND OF THE INVENTION

1. Field of the Invention

Embodiments of the present invention relate generally to recording data, such as music or movies. More specifically, embodiments of the present invention relate to storing the data at the time a subscriber experiences it, such as while listening to a car radio or while watching a movie at a movie theater.

2. Background

There are numerous times when one sees or hears something that he or she would like to store for future use. For example, while driving a car, one may hear a song playing on the car radio that he or she would like to record for future listening. Similarly, in a movie theater, one may hear a song or see a movie that he or she would like to store for future listening or viewing. However, in these and many other circumstances such storage is inconvenient or impossible. For example, in the case of driving a car, systems for recording the music are rare, and to the extent that they exist, they have a significant drawback. That drawback is that the song is not stored from its beginning. Rather, the song is only stored from the time that the subscriber indicates that he or she desires that it be recorded. This is undesirable because the whole song is not recorded. Similarly in a movie theater, there is no way to store the song or soundtrack of the movie at the time it is heard. There are numerous other examples where a person may desire to store data he or she is experiencing, for example, a song playing on the radio, a movie soundtrack while viewing a movie or the movie itself.

In addition to recording music, people also often desire to store the music in different formats. For example, a person may hear a song on the radio and desire to store the song as a ring tone for a telephone such as a cellular telephone. Conventional systems allow cellular telephone subscribers to select and upload to their cellular telephones various pre-recorded ring tones. Conventional systems further allow cellular telephone subscribers to create or generate their own ring tones. However, such systems do not allow subscribers to store a song that they are currently listening to as a ring-tone or in some other format.

SUMMARY OF THE INVENTION

The present invention provides subscribers with the ability to store music, and other data, at the time they experience it. For example, music can be stored when it is heard, such as while driving in a car. In addition, movies and/or movie soundtracks can be stored while sitting in a movie theater.

In one embodiment, the present invention is a system for storing music. The system includes a device for playing music that is heard by a subscriber. When the subscriber hears music that he or she desires to store, the subscriber requests such storage. A request is generated in response to a subscriber request to store music. A transmitter in the system transmits the generated request to obtain the music for storage. A music database is queried to obtain music responsive to the subscriber's request. The music is sent to a storage device that receives and stores the music.

In another embodiment, the present invention is a method for storing randomly selected music on demand. The method includes receiving an indication from a subscriber to store music to which the subscriber is listening. The method continues with the steps of generating and transmitting a request to obtain the desired music from a music storage database. The method continues with the step of transmitting a file comprising the music desired to be stored for storage in response to the request. The method then continues with the step of storing the music.

In another embodiment, the present invention is a system for storing one or more of a movie, song in a movie or a movie soundtrack. The system includes a seat in a movie theater having a card reader to read a card provided by a subscriber. The system includes a first computer coupled to the card reader obtains information from the card and determines an identity of the movie, song and/or movie soundtrack. A second computer coupled to the first computer obtains the information from the first computer. The system also includes a database that has data corresponding to one or more movies, songs in the movies and movie soundtracks that is queried by the second computer and provides data corresponding to the identified movie, song, or movie soundtrack to the second computer in response to the query. A destination computer receives the data from the computer and a storage device store the data received from the database.

DETAILED DESCRIPTION OF THE INVENTION

Figure 1:
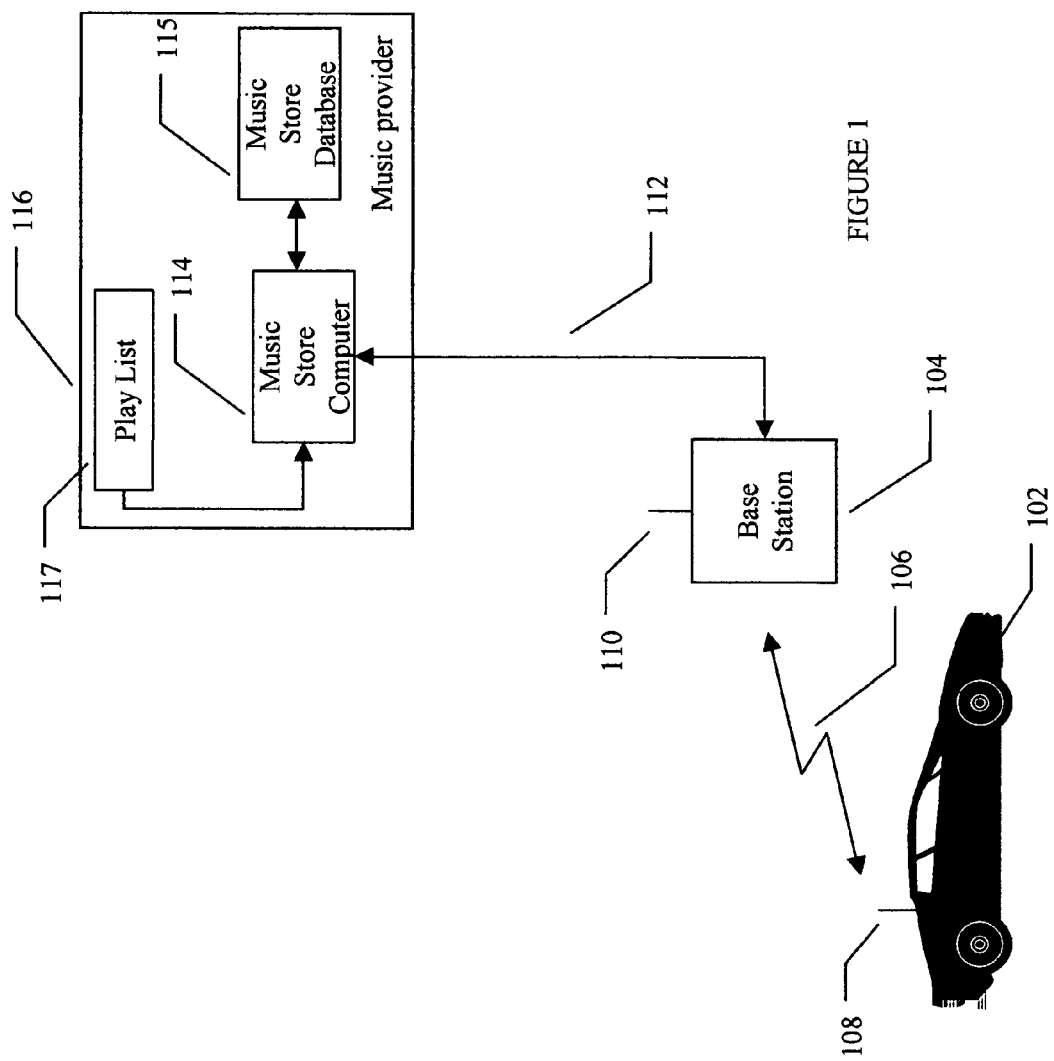
FIG. 1 is a schematic diagram of a system for storing music according to a first embodiment of the present invention.

FIG. 1 is a schematic diagram of a system for storing music according to a first embodiment of the present invention. A subscriber driving a car 102 hears music he or she desires to store. When the subscriber hears the music desired to be stored the subscriber indicates his or her desire to store the music. The indication is a request by the subscriber to store music he or she is listening to at the time that he or she is listening to it. The indication can be provided in numerous ways. For example, according to one embodiment of the present invention, the subscriber presses a button. In an alternative embodiment of the present invention, the indication is provided by a voice command. In another embodiment of the present invention, the indication is provided by sliding a credit card or other card through a card reader.

When the subscriber's indication is detected, a request is caused to be transmitted to a base station 104 over an air interface 106 through an antenna 108 on car 102. Base station 110 receives the request through an antenna 110. Methods for communicating the request from car 102 to base station 110 are well known to those skilled in the art. For example, in one embodiment of the present invention, base station 104 is a cell phone base station, in which the request is transmitted to the base station according to well-known cellular telephone protocols. In another embodiment of the present invention, base station 104 is a Wi-Fi hot spot, wherein the request is communicated using well-known 802.11b or 802.11g protocols. Other methods for communicating the request from car 102 to base station 104, such as Bluetooth technology, would be appreciated by those having skill in the art.

The request contains information required for carrying out the functions of the present invention. For example, the request can include the subscriber's name and/or telephone number. Using this information, the music provider can obtain other required information from an account that has been created for the subscriber. In addition, the request can obtain an identification of the music to store, the time the request was made or any other information required to carry out the functions of the present invention described herein.

Base station 104 then transmits the request to a music store computer 114 in a music provider 116. Music provider 116 can be, for example, a radio station that plays songs heard by the subscriber. Music store computer 114 is coupled to a music store database 115. Music store database 115 stores music corresponding to the music that is heard by the subscriber. Music store computer 114 can be any computer that can be configured to operate in the manner described herein. Such computers, including for example, desktop computers and laptops, are well known and need not be described in detail further.

Music store computer 114 is configured to receive the request and determine what music the subscriber desires to store. The music the subscriber desires to store is the music being played by music provider 116 at or near the time the subscriber makes his or her request to store the music. For example, music store computer 114 can consult a play list 117 of music provider 116 to determine the song being played by music provider 116 at the time that the request is received or a time that is included in the request when transmitted.

Play list 117 is a list of songs provided (i.e., played) by music provider 116. In an embodiment of the present invention, play list 117 has a time slot associated with the songs listed therein. The time slot indicates the time of day the song is scheduled to be played by music provider 116. Music store computer 114 can consult a time slot of the play list to determine the song that was scheduled to be played at a particular time, and the song so scheduled as the song responsive to the subscriber's request.

After determining the song that is being played, music store computer 114 uses that information to query a music store database 115. Music store database 115 stores complete versions of the songs corresponding to the music that music provider 116 provides. For example, where music provider 116 is a radio station, music store database 115 stores the music corresponding to the radio station's play list. The music can be updated periodically as the music provided by music provider 116 changes. The music can be stored in any format. For example, in one embodiment of the present invention, music is stored in music store database in a digital format.

The result of the query is that the music identified in the subscriber's request is transferred to music store computer 114 from music store database 115. An advantage of the present invention is that the entire song is transferred, not just the portion of the song from the time the subscriber selects it. This is advantageous because the subscriber does not need to select the song at its very beginning in order to store the entire song. Another advantage of the present invention is that the subscriber does not have to know the artist or title of the song in order to store it.

Music store computer 114 then transfers the music to base station 104. Base station 104 then transmits the music to car 102 using any transmission protocol for storage therein. Such transmission protocols are well known to those skilled in the art, and include for example, cellular telephone protocols, Wi-Fi protocols, or any other transmission protocol that can be used to transmit the music. The music is stored in a music storage device in car 102.

Figure 2:
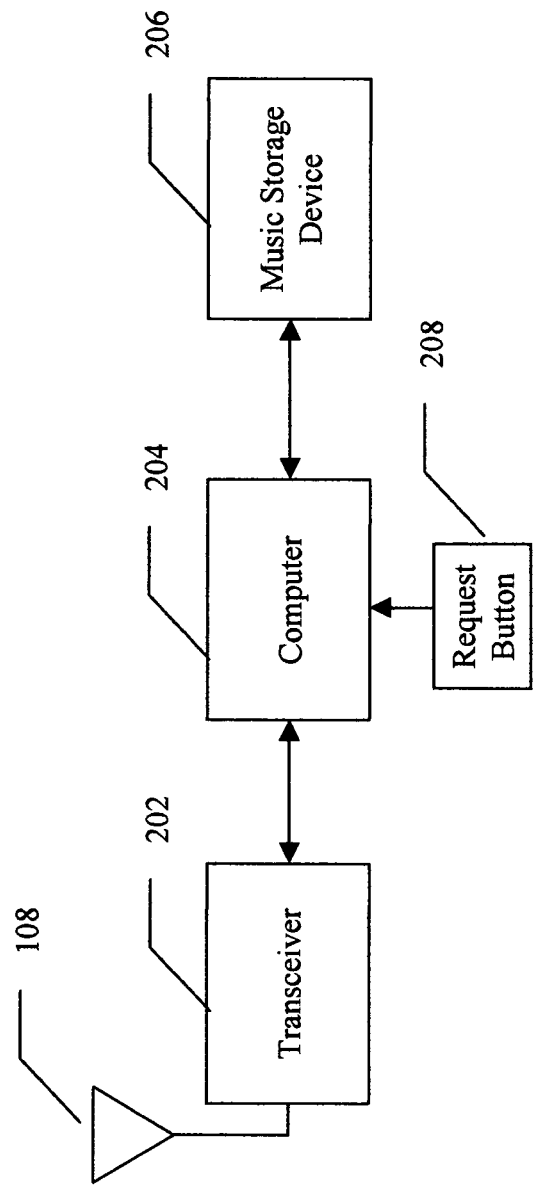
FIG. 2 is a schematic diagram of a system for storing music in a car according to an embodiment of the present invention.

FIG. 2 is a schematic diagram illustrating storage of music in car 102 according to an embodiment of the present invention. A transceiver 202 receives the music through an antenna 108. Transceiver 202 can be any radio/transmitter combination, and does not have to be integrated in a single unit. The received music is demodulated by transceiver 202 and transferred to a computer 204. Computer 204 can be any computer configured to receive music from transceiver 202. Though shown as external in FIG. 2, the receiver can be internal or external to computer 204.

Computer 204 is coupled to a music storage device 206. Music storage device can be any device that can store the music transmitted to it by computer 204. For example, music storage device 206 can be a CD-ROM, a DVD or a RAM device. Well known techniques for burning CD-ROMs or DVDs can be used where music storage device 206 is a CD-ROM or DVD storage device.

Transceiver 202, computer 204 and music storage device 206 are configured to fit inside of car 102. Transceiver 202 can be any transceiver designed for the purposes of transceiver 202 described above. For example, in one embodiment of the present invention, transceiver 202 is a standard car stereo that can receive and demodulate signals from base station 104 as well as modulate and transmit the subscriber's request for storing music. In this embodiment of the present invention, receiver 202 is located in a dashboard of car 102. The computer and music storage device can be located anywhere in car 102. A common location is in a trunk of car 102.

A storage button 208 that the subscriber presses to request storage of a song can be located in a number of places in car 102. For example, in one embodiment of the present invention, the storage button 208 is located on a control panel (front) of a conventional car stereo. In another embodiment of the present invention, the storage button 208 is located on the steering wheel of car 102. In operation, pressing storage button 208 causes computer 204 to generate the request.

Figure 3:
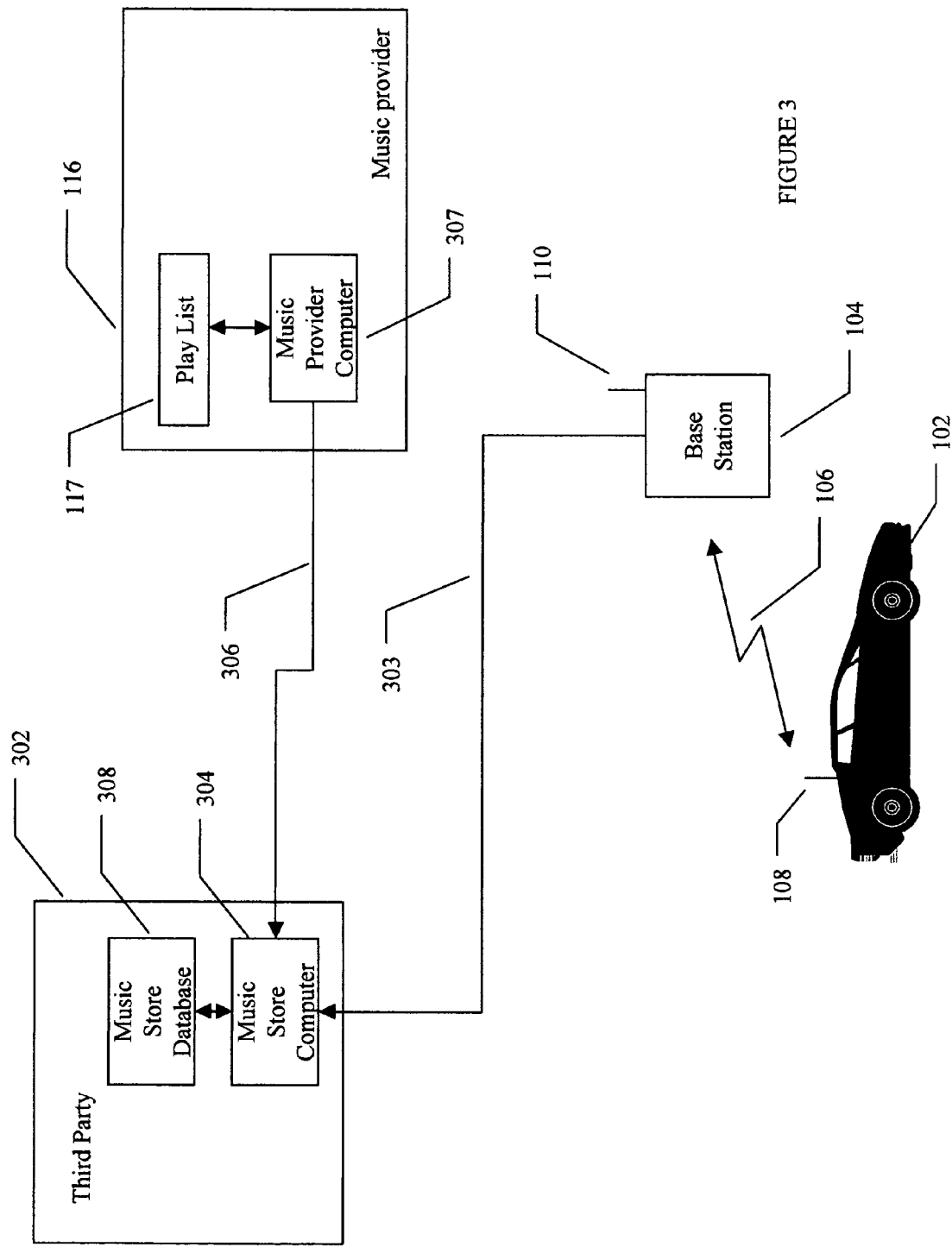
FIG. 3 is a schematic diagram of another embodiment of the present invention in which a third party music service provides music storage and retrieval services rather than the subscriber or the music provider.

FIG. 3 is a schematic diagram of another embodiment of the present invention in which a third party music service 302 provides music storage and retrieval services rather than the music provider. For example, third party music service 302 can be a business set up to retrieve and deliver music according to the present invention.

In the embodiment of the present invention illustrated in FIG. 3, a subscriber makes a request for music in the manner described above with respect to FIG. 1. The subscriber's request causes a request to be generated. The request can be as described above. In addition, in the embodiment of the present invention illustrated in FIG. 3, the request is configured to include an identification of the music provider, for example, music provider 116. This identification is required because in the embodiment of the present invention illustrated in FIG. 3, a third party music service 302 is designated to respond to the subscriber's request, not music provider 116.

The request (including the identification of the third party music service) is received in the base station and transmitted from base station 104 to third party music service 302 over a transmission interface 303. Transmission interface 303 can be any transmission interface, including air or land, including for example, computer networks, telephone networks, satellite networks, and combinations of such networks, that is capable of transmitting the request from base station 104 to third party music service 302. Such transmission interfaces as well as transmission of the request over such transmission interfaces are well known to those skilled in the art.

A music store computer 304 receives the request. Music store computer 302 can receive the request directly if it is configured to receive transmissions from interface 303 or it can receive the request from other equipment (not shown) that is capable of receiving the request transmitted over transmission interface 303.

When the request is received, music store computer 302 extracts the identification of the music provider that is playing the music that the subscriber wants to store from the request, for example, music provider 116. Music store computer 302 then generates a music identification request that it sends to a music provider computer 307 in music provider 116. Preferably, the identification request comprises the extracted identification. Music store computer 114 in FIG. 1 can also be configured to perform the functions of receiving and responding to requests from third party music services according to the present invention.

Music provider computer 307 receives the music identification request and determines that it is a request to identify music that is being played at the time of the subscriber's request. In one embodiment of the present invention, music provider computer 307 consults play list 117 to identify the music is being played at the time of the subscriber's request to store the music. As described above, for example, the identification can be by title, artist, a music catalog number or any other identification of the music.

Music computer 307 transmits or causes to be transmitted the identification of the music to music store computer 304. Music store computer 304 receives the identification of the music and uses it to query a music store database 308. Music store database 308 receives the query containing the identification of the music, retrieves the music based on the identification and forwards the music to music store computer 304. Music store computer 304 forwards the music to base station 104, which then transmits the music to vehicle 102 for storage therein as described above.

In alternative embodiments of the present invention, music provider 116 receives the request for identification of the music from music store computer 304 and itself responds to the request by transmitting the music to base station 104 as described above. In this manner, music service 302 does not have to keep its own independent copy of music store database 308.

In another embodiment of the present invention, music store computer 304 receives the identification of the music being played from music provider 116 and sends it to another party (not shown) that has a music store database with instruction that the other party satisfy the subscriber's request by sending the music corresponding to the identification through base station 110 to car 102 for storage.

If third party music service provider 302 determines that it does not have the requested music stored in music store database 306, it can send a message so indicating to be displayed to the subscriber in car 102. For example, such message can be displayed on the radio display of car 102.

Figure 4:
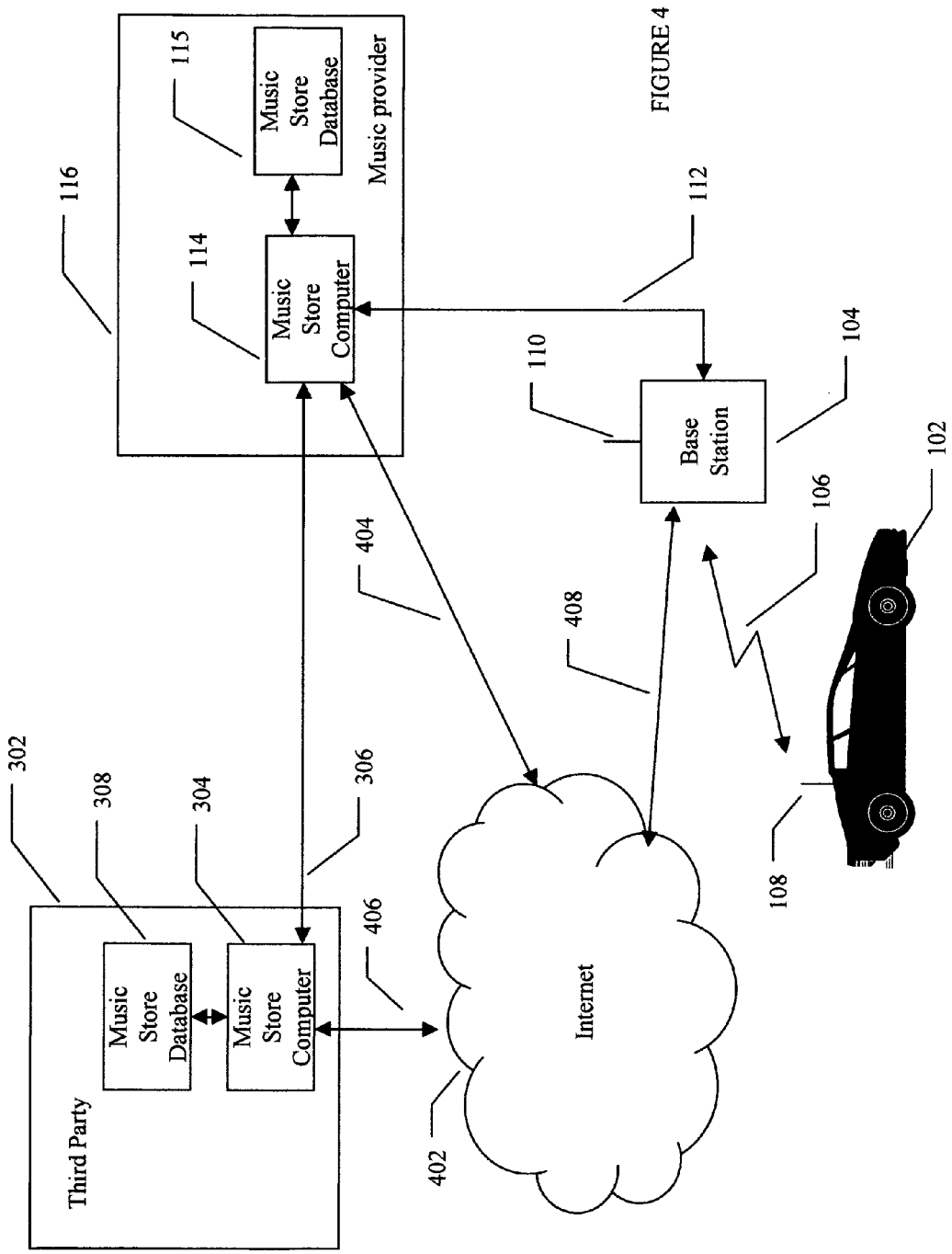
FIG. 4 is a schematic diagram of a system for storing music according to another embodiment of the present invention.

FIG. 4 is a schematic diagram of a system for storing music according to another embodiment of the present invention. The embodiment illustrated in FIG. 4 uses many of the concepts described above for communicating a subscriber request to store music to a party that satisfies that request.

FIG. 4 is intended to more clearly illustrate the communication of the subscriber's request using the Internet 402. It would be appreciated by those skilled in the art that any computer network can be used, provided it has the appropriate devices connected thereto for carrying out the present invention. As shown in FIG. 4, music provider 116, third party music provider 302 and base station 104 are coupled to the Internet 402 through links 404, 406 and 408 respectively. These Internet connections are established in manners that are well known to those skilled in the art.

In operation, for example, a subscriber desires to store music that he or she hears while traveling in car 102. In an embodiment of the present invention, the subscriber indicates this desire by pressing a button. Pressing the button, causes a request to be generated. The request is sent to base station 104. Base station 104 can forward the request to a number of places. In one embodiment of the present invention, for example, base station 104 determines where to send the request based on an address included in the request. The address is the network address of the computer that the request is to be sent to. When using the Internet, the request also includes appropriate addressing for forwarding the request to the appropriate music provider to handle the request. This can be for example, a computer network address of a music store computer 114 or music store computer 104.

The subscriber can also give gifts using the present invention. For example, the subscriber can provide the address of a gift recipient's computer as the computer network address. By providing the gift recipient's computer address, the music is stored to the gift recipient's computer.

Base station 104 determines the address of a computer associated with the music provider that will handle the request, and forwards the request to the music provider indicated by the address included in the request. The address can be predetermined and stored in base station 110 or can be provided in the request sent to base station 104. In the latter instance, the request is stored in the computer making the request, for example computer 204. The music provider associated with the address receives the request, and identifies the music desired by the subscriber as described above. The music is retrieved and sent back through the Internet to base station 104. Base station 104 transmits the music to car 102 where it is stored as described above. Base station 104 can also send the music to any other music storage device having an Internet address. For example, as described above, the music can be stored in a music storage device in the user's home.

Music providers are able to bill for their services. Such billing can be on a per use basis or a periodic basis and can be prepaid or postpaid. A per-use subscriber is billed for each use of the system, for example, for each music storage request. A periodic subscriber is billed for using music storage services according to the present invention for a period of time, for example, one month. During that period of time, the subscriber can make as many requests for storage of music as desired. Other billing paradigms can also be used.

Billing requires that subscribers be uniquely identifiable. This subscriber identification can be implemented any way to uniquely identify the subscriber. A common such way is to assign an account having an account number to the subscriber. The account can be created during a registration process. The account number can be assigned to the subscriber through the registration process.

Information about the subscriber can also be obtained during this registration process. The information can be stored in a configuration file or other account file of the subscriber. For example, the subscriber's name, address, age, income, ethnicity, sex and any other information can be obtained. This information can be used to create reports concerning which types of subscriber's use the service, when they use it and what music they prefer. Such reports can be sold to interested parties. Information required for billing, such as credit card account information, electronic contracts, billing information and any other required billing information can be obtained from the subscriber during registration. Any such information obtained is stored, for example, in an account corresponding to the subscriber.

The account number can be stored in computer 204. When the subscriber's request is transmitted to the music provider, the account number can be transmitted as well. The music provider receives the account number and uses it to access an account associated with the subscriber. One purpose for accessing the account is to obtain billing information so that the subscriber can be appropriately billed for using the service.

Another reason for accessing the account is to store information about the request for generating reports as described above. The information can include any information. For example, the information can include the title of the music, the artist of the music, the time the request was made and any other desired information.

In operation according to one embodiment of the present invention, an identification of the subscriber, for example a subscriber account number, is included in the request transmitted to base station 104. When the music provider receives the request, it extracts the subscriber identification and uses it to access the subscriber's account. This account can be, for example, the subscriber's account created during registration. If the subscriber is a per-use subscriber, the music provider accesses the account and bills the subscriber appropriately. For example, in a per-use billing embodiment of the present invention, the billing may be a one up number stored in the subscriber's account indicating the number of times the service was used. This number is then consulted at the end of a billing period, for example, a month, and the subscriber is billed in accordance with this one up number. After billing, the one up number is reset.

If the subscriber is a periodic subscriber, the music provider accesses the account to verify that the subscriber is a registered subscriber. If the subscriber is a registered subscriber, the subscriber's request is satisfied. If the subscriber is not a registered subscriber, the subscriber's request is denied.

Subscribers can also prepay to use a system according to the present invention. Such prepayment can be on a per-use or periodic basis. In a prepay system, the subscriber pays in advance of using the service. The subscriber's account is increased by the amount paid. In a prepaid per-use system, each time the subscriber uses the service, the account is reduced by an appropriate amount (the per-use cost to the subscriber to use the service). In a prepaid periodic system, at the beginning of the period, or any other desired time, the subscriber's account is deducted by an amount corresponding to the fee for periodic use of the music storage service.

It should be understood that music providers can use any combination of billing. For example, music providers can offer per-use billing to some subscribers, periodic billing to some subscribers and prepaid billing to some subscribers.

A problem that might be encountered when storage of the music is to a mobile platform such as car 102 is that of interrupted service during downloading of music from the music provider responding to the subscriber's request. For example, if vehicle 102 moves out of a coverage area of base station 104 during downloading of music, it is likely that an incomplete file will be downloaded. Cellular telephone service has reduced this problem somewhat through its handoff technology. Thus, if vehicle 103 is communicating with a base station that is a cellular telephone base station, it can use cellular handoff technology to possibly continue the download process.

However, downloading can be interrupted even using handoff technology. To overcome this problem in one embodiment of the present invention, a download success flag is used. The download success flag default is TRUE, indicating that a download was successful. If however, a download is unsuccessful, the download success flag is set to FALSE. In one embodiment of the present invention, the download success flag is stored in computer 204. Computer 204 monitors the success flag. If computer 204 determines that the success flag is FALSE, it takes action as described below. After the corrective action is taken, the download success flag is reset to TRUE.

When computer 204 determines that the success flag is set to FALSE, computer 204 causes the subscriber request to be retransmitted when communication is established with a base station that can respond to the request. For example, car 102 may come within the coverage area of another base station that can respond to requests to store music according to the present invention. The retransmitted request can contain the same information as in the originally transmitted request. In addition, the retransmitted request can contain any other information to identify the request as a retransmitted request.

In an embodiment of the present invention, the retransmitted request causes music to be downloaded to vehicle 102 from the beginning of the music file. Storage of the music takes place as described above. In this embodiment, preferably, the file that may have been started previously is deleted or written over.

In another embodiment of the present invention, a progress marker is used to indicate how much of the music has been successfully downloaded. For example, if 50 percent of music file was successfully downloaded, the progress marker would so indicate. For example, the progress marked can be in terms of amount of data sent in bytes, percentage of file successfully transmitted or any other progress indication that provides the amount of the file successfully sent.

Using a progress marker precludes the need to restart downloading of the music from the beginning of the music file. Rather, the progress marker can be sent in a retransmit request. In this case, the music file from which the music is obtained is opened, and downloading begins from the point indicated by the progress marker. For example, if the progress marker indicates that 50 percent of the file had been successfully transmitted, downloading begins with the data after that 50 percent. If the progress marker is in terms of absolute number of bytes sent, downloading begins with the next byte in the file as indicated by the value of the progress marker.

In one embodiment of the present invention using a progress marker, the originally downloaded portion of the file is opened, and the new data is appended to this file. Use of the progress marker makes the downloading process more efficient in the event of interrupted downloading because downloading does not have to begin from the beginning of the music file. Rather only the portion not yet downloaded need be obtained. The progress marker can be updated if there is another interruption of music, and the process of re-downloading the music file is repeated using the updated value of the progress marker.

In another embodiment of the present invention, base station 104 is a cellular telephone base station. This embodiment of the present invention provides another means for requesting the music storage service of the present invention. In this embodiment of the present invention, the subscriber makes the request for storing music using a cellular telephone. For example, such a request can be made by dialing a special music request number on the cellular telephone. By dialing the music request number, the subscriber is connected to a music provider, be it the provider that actually plays the music or a third party music provider.

Upon receiving the telephone call, the music provider attempts to determine the music that is requested. Where the music provider is the provider of the actual music that the listener hears, this can simply be a query of a play list to determine the music that is being played at the time of the telephone call.

Where the music provider is a third party music storage provider, several techniques can be used for determining the identity of the music provider. For example, the music provider can prompt the subscriber to enter the call letters of a radio station that the subscriber is listening to. Alternatively, the subscriber can input the call letters of the radio station using the corresponding keys on the dial pad of the cellular telephone. Another technique that can be employed is to have the subscriber speak the call letters of the radio station into the phone. The music provider can use well-known voice recognition techniques to decode the spoken call letters to determine the identity of the music provider.

In another embodiment of the present invention, the subscriber enters or is prompted to enter one or more digits that correspond to the radio station that the subscriber is listening to. The digits can be compared to a list that has music provider identities and corresponding one or more digits that can be entered by the subscriber. Such a list for example, can be a table stored in a memory of third party music computer 304. This table can be generated from information provided by the subscriber when the subscriber registers for the music storage service offered by a third party music storage provider. Alternatively, the table is pre-configured. In one embodiment of the present invention this table is modifiable by the subscriber, for example, by accessing a website of the third party provider that makes such modification possible.

In another embodiment of the present invention, the cellular telephone used to communication with base station 104 and the car radio are configured so as to allow communication with one another. Such communication can be provided using well known Bluetooth technology for example.

Upon receiving the identification of the music provider that is providing the music that the subscriber desires to store, the third party music provider contacts the music provider associated with the entered call letters and responds to the request as described above.

Music can be downloaded to other devices besides storage in a vehicle according to other embodiments of the present invention. For example, the subscriber can have music downloaded to a cellular telephone, a landline telephone, a portable telephone, a pager, a personal digital assistant (PDA), a personal computer, an iPOD, or any other device the subscriber desires to download the music to.

Regardless of the device, the download can be of the entire music file or of a portion of the music file. Preferably, the music is downloaded in a format that the device can use without requiring further formatting. In an alternative embodiment of the present invention, the music is downloaded in its native format and converted to a format that the device can use. For example, in one embodiment of the present invention in which music is downloaded to a telephone, the music is downloaded in a well-known ring tone format.

In one embodiment of the present invention, the subscriber can choose to download the music to a cellular telephone. In this embodiment of the present invention, the download can be for a variety of purposes, including for example, for use as a ring tone or for use to play through the cellular telephone speaker.

Figure 5:
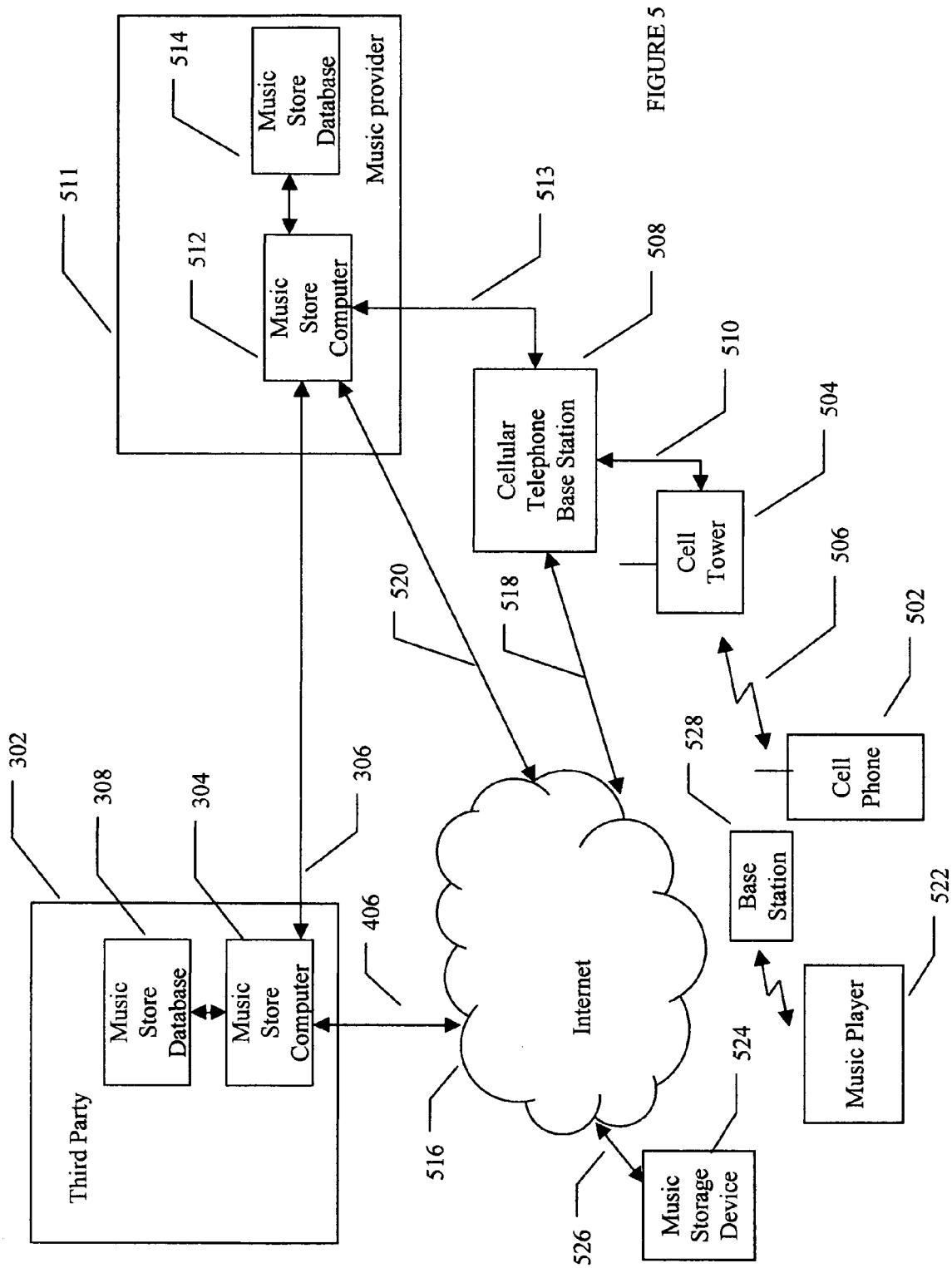
FIG. 5 is a schematic diagram of an embodiment of the present invention in which the receiving device is a cellular telephone.

FIG. 5 is a schematic diagram of an embodiment of the present invention in which the receiving device is a cellular telephone. A cellular telephone 502 communicates with a cell tower 504 of an air interface 506. Cell tower 506 in turn is in communication with a cellular telephone base station 508, for example a mobile telephone switching office (MTSO), over link 510. Cellular telephone base station 508 is in communication with a music store computer 512 in a music provider 511 over a link 513. Music store computer 512 is coupled to a music store database 514. Cellular telephone base station 508 is also in communication with the Internet 516 over a link 518. Music store computer 512 is in communication with the Internet 516 over a link 520. Links 510, 513, 518 and 520 can be any communication links for carrying data transmissions. Such links include air interfaces, land lines, and satellite links and are well known to those skilled in the art.

In operation, a subscriber listening to a music source 522 hears music that he or she desires to download to their cellular telephone. Music source 522 can be any device for playing music provided by a music provider. For example, music source 522 can be a home stereo, a car stereo, a walkman, a portable radio, a personal computer, a cellular telephone, a pager, or any other device capable of playing music.

When the subscriber hears music he or she desires to store, the subscriber provides an indication of such desire. That indication can take many forms as described above, including for example, voice activation or manual activation such as by pushing a button. In one embodiment of the present invention, the indication is received by music source 522, which causes a request for music storage to be made much in the same way as described above. As described above, the music request is satisfied and the music is stored. The music is stored on a music storage device 524. Music storage device 524 can be any music storage device, including for example, CD-ROM, DVD, RAM, hard disk, floppy disk, removable disk storage device or any other device on which music data can be stored.

In an embodiment of the present invention, music storage device 524 is coupled to Internet 516 over a link 526. Link 526 can be any link coupling music storage device 524 to Internet 516, including land line, air interface, cellular link, satellite link or any other link. Music storage device 524 does not have to be coupled to Internet 516 directly. That is, music storage device 524 may be coupled to Internet 516 through a modem in a personal computer. Such couplings of music storage device 524 to Internet 516 would be well known to those having skill in the art.

In operation, the subscriber provides the indication or request to store the music to cellular telephone 502. Cellular telephone 502 is configured to accept the indication. This can be by configuring the cellular telephone 502 with voice recognition hardware and/or software to recognize the indication or by configuring cellular telephone 502 to recognize a special code entry. The code entry can be any code entry such as any alphanumerical sequence, for example, a numerical code or a star code. Those skilled in the art would recognize other techniques for configuring cellular telephone 502 to recognize the indication by the subscriber.

When cellular telephone 502 receives the indication from the subscriber to store the music it transmits a message to base station 508 through cell tower 504. The message is a request to retrieve and store the music. The music can be stored as desired by the subscriber. For example, the music can be stored as a ring tone to the cellular telephone 502 as described above or to any other location, such as described above. Several techniques for identifying the storage location can be used. For example, the storage location can be sent in the message to base station 508.

Alternatively, the subscriber can store the storage location in the configuration file described above. In such a case, based station 508 is configured to retrieve the configuration file to determine the storage location. Depending on the provider of the service, the configuration file can be located within base station 508 or in some other location. If the configuration file is stored in base station 508, base station 508 simply accesses the configuration file.

If the configuration file is located in another location, base station 508 retrieves the file. To retrieve the proper configuration file, base station 508 must determine that location. In one embodiment of the present invention, base station 508 accesses a record associated with the mobile identification number (MIN) of cellular telephone 502. For example, base station 508 can access the subscriber's cellular telephone account. This can be accomplished by accessing the home location register or visitor location records associated with the MN. Such records would need to be configured to store the location of the music storage preference of the subscriber.

Base station 508 retrieves the configuration file and determines from the information contained therein the location where the subscriber desires the music to be stored. Base station 508 packages this information in another message that it forwards to the music provider that provides the music the subscriber desires to store. The music provider's identity is provided in the request message sent to base station 508. The request sent to base station 508 is similar to requests described above.

The identity of the music provider must be provided to base station 508. In an embodiment of the present invention, cellular telephone 502 is in communication with music player 522. Such communication can be provided using Bluetooth technology that allows devices to detect and communicate with one another. When the subscriber indicates that he or she desires to store music using cellular telephone 502, cellular telephone 502 queries music player 522 for the identity of the music provider providing the music at the time of the subscriber's request. Alternatively, music player 522 detects the subscriber's indication and sends the identity of the music provider to cellular telephone 502. Cellular telephone 522 then places the identity of the music provider in the request that it sends to base station 508.

In another embodiment of the present invention, music player 522 detects the subscriber's indication and itself generates a request through a base station 508 to obtain and store the music in accordance with the subscriber's request as described above.

Using the identity of the music provider found in the request, base station 508 contacts the music provider to obtain the music. This can be done as described above. As described above, the music can be downloaded to base station 508 for forwarding to the location for storing the music specified by the subscriber. Alternatively, base station 508 can transmit the identity of the storage location to the music provider. The music provider then causes the music to be stored in the location specified by the request. Satisfaction of the music storage request proceeds as described above.

In addition, in the embodiment described in FIG. 5, a third party music provider 302 can offer music provider services as described above.

Figure 6:
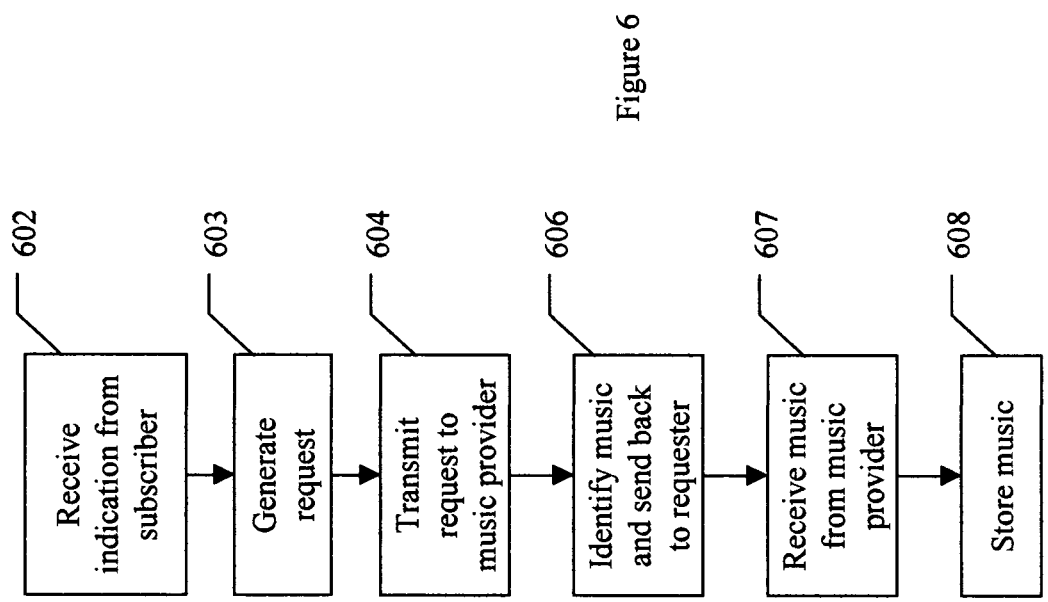
FIG. 6 is a flow chart for a method for storing randomly selected music according to an embodiment of the present invention.

FIG. 6 is a flow chart for a method for storing randomly selected music according to an embodiment of the present invention. A subscriber provides requests (indicates a desire) to store music at the time he or she hears it. As described above, the request can take a number of forms including pushing a button or a voice indication. In step 602, the indication is received. In step 603, a request is generated, for example, by a base station. The request, as described above, includes information required for the subscriber's request to be satisfied. The request is transmitted to a music provider in step 604. In step 606, music corresponding to the request is identified, retrieved and sent back to the requester. The music is received from the music provider in step 607. The music is stored in step 608.

Figure 7:
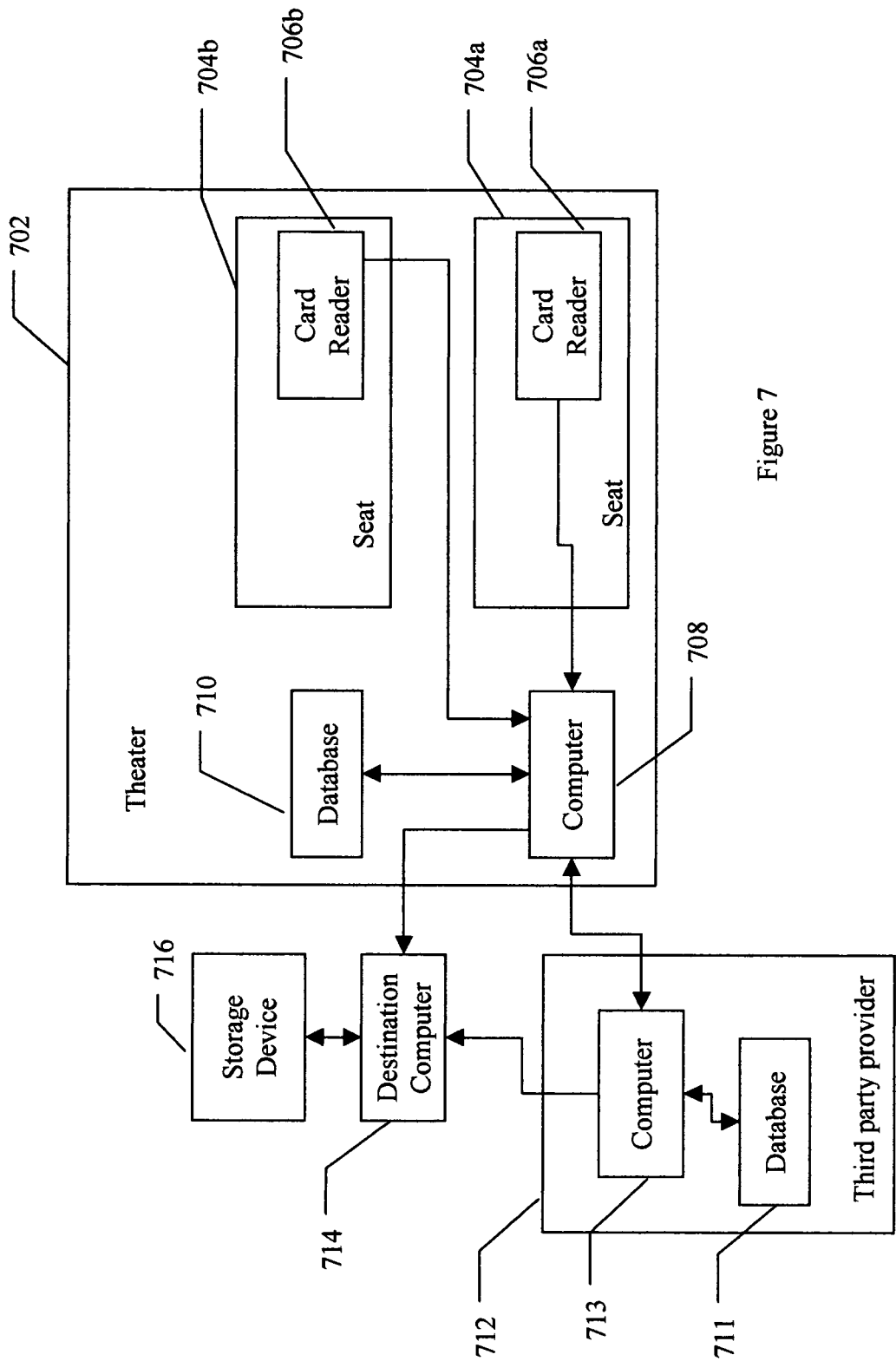
FIG. 7 is a schematic diagram of an embodiment of the present invention for use in storing music or movies that a subscriber hears or views while watching a movie.

FIG. 7 is a schematic diagram of an embodiment of the present invention for use in storing music or movies that a subscriber views in a movie theater. A movie theater 702 contains at least one seat 704a and 704b. One or more of seats 704a and 704b has a card reader, for example card readers 706a and 706b. Card readers 706a and 706b are used to read for example a credit card, a debit card, a memory card or any other memory storage card.

In operation, a subscriber desiring to store a song, a movie or soundtrack of a movie to a storage device sits in a seat having a card reader. For example, the subscriber can sit in seat 704a having card reader 706a. When the subscriber desires to store music that he or she hears during a movie, or the entire movie soundtrack or the movie itself, the subscriber slides his or her credit card, debit card or other payment card through card reader 706a. For example, the card can be a card provided by the movie theater, a record company, a movie studio or other provider. Such a card can be issue in response to a registration process in which the user obtains the card. The cards can be prepaid or pay-for-service via a subscriber account as described above.

The music is the song playing in the movie at the time the subscriber indicates his or her desire to store the song. The soundtrack is the movie soundtrack and the movie is the movie itself. Card reader reads the information on the subscriber's card, and generates a request using the information. For example, the request can include the subscriber's name, phone number or other identifying information related to the subscriber.

The request is sent to a computer 708. Computer 708 is any computer, for example a PC or laptop computer that is configured to perform the functions described herein. Such computers that can be configured to perform the functions described herein would be well-known to those having skill in the relevant art.

Computer 708 must determine the identity of the movie, song or soundtrack requested by the subscriber. This can be done in a number of ways. For example, in one embodiment of the present invention, several buttons are provided near the card reader that the subscriber can press to indicate his or her desire. For example, in one embodiment of the present invention, three buttons are provided: one labeled "movie", one labeled "song" and the other labeled "soundtrack". In one embodiment of the present invention, the subscriber slides his or her card at any time during the movie. The request is generated when a particular button is pressed.

Computer 708 then satisfies the subscriber's request by obtaining the requested, movie, song or soundtrack and causing it to be forwarded to a destination computer 714 for storage on a storage device 716. Destination computer 714 and storage device 716 are associated with the subscriber. For example, destination computer 714 and storage device 716 can be in the subscriber's car, the subscriber's home or some other destination.

Gifts can be given by designating the address of a computer associated with the recipient as the destination computer. Where the storage is storage of a movie, the movie can be stored on the storage device but not released or available for viewing by the subscriber until after a pre-determined release date.

In one embodiment of the present invention, a database 710 located at the theater in which the subscriber is viewing the movie stores movies, songs and soundtracks. Computer 708 is configured to query database 710 with the identity of the song, movie or soundtrack requested by the subscriber to obtain the digital file that has a digital representation of the movie, song or soundtrack. The data is obtained and forwarded to destination computer 714 for storage on storage device 716. The data can be forwarded over the Internet or any other method for transmitting the data from computer 708 to destination computer 714.

In one embodiment of the present invention, the address of destination computer 714 is provided in a registration process that the subscriber performs to register with the theater to use the movie, song and/or soundtrack storage service of the present invention.

In another embodiment of the present invention, a third party music provider 712 provides the music storage service of the present invention. Third party provider can be any third party provider, including for example, a movie studio, record company or other third party provider. In the case of the third party music provider 712, computer 708 transmits a request to a computer 713 of third party provider 712. The request includes information that is required by third party provider 712. For example, the request can include the identity of the song, movie or soundtrack to be stored and the address of destination computer 714 to which to send the data for storage on storage device 716. Using the information provided in the request, for example, the identity of the song, movie or soundtrack, computer 713 obtains the data corresponding to the song, movie or soundtrack from a database 711. Database 711 stores digital data corresponding to songs, movies or soundtracks that third party provider 712 can provide.

Computer 713 obtains the appropriate data from database 711 and forwards it to destination computer 714. The data can be forwarded in a number of manners, including over the Internet or other computer network. The data is then stored on storage device 716.

In another embodiment of the present invention, only the soundtrack or movie or song is available to the subscriber. That is, the theater only provides the subscriber with the ability to store either the movie, soundtrack or song at the time of the subscriber's indication of a desire to store the data. In this case, the data stored obtained by computer 708 for transmittal destination computer 714 for storage on storage device 716 is either the movie, soundtrack or song playing at the time of the indication depending upon the particular implementation of the present invention.

In alternate embodiments of the present invention, the subscriber does not have to be using the cellular telephone at the time the subscriber hears the music in order to download the ring tones. For example, the user can indicate in his account that music is to be downloaded to the user's cellular telephone in the form of a ring tone. When the subscriber requests storage of music, the music is stored to the subscriber's cellular telephone.

Figure 8:
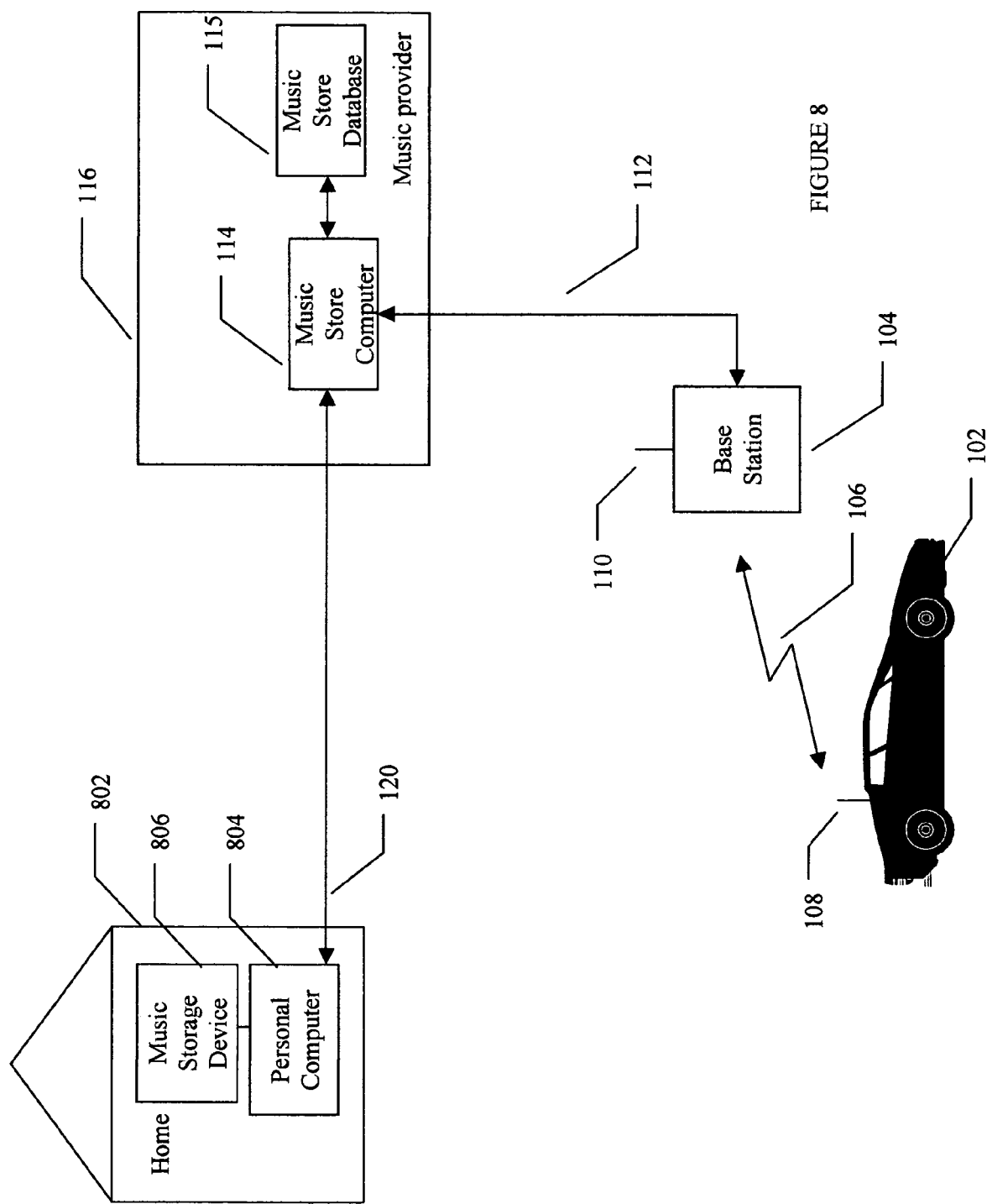
FIG. 8 illustrates an embodiment of the present invention in which the storage apparatus for storing the data requested by the subscriber is located in a home of the subscriber.
Figure 9:
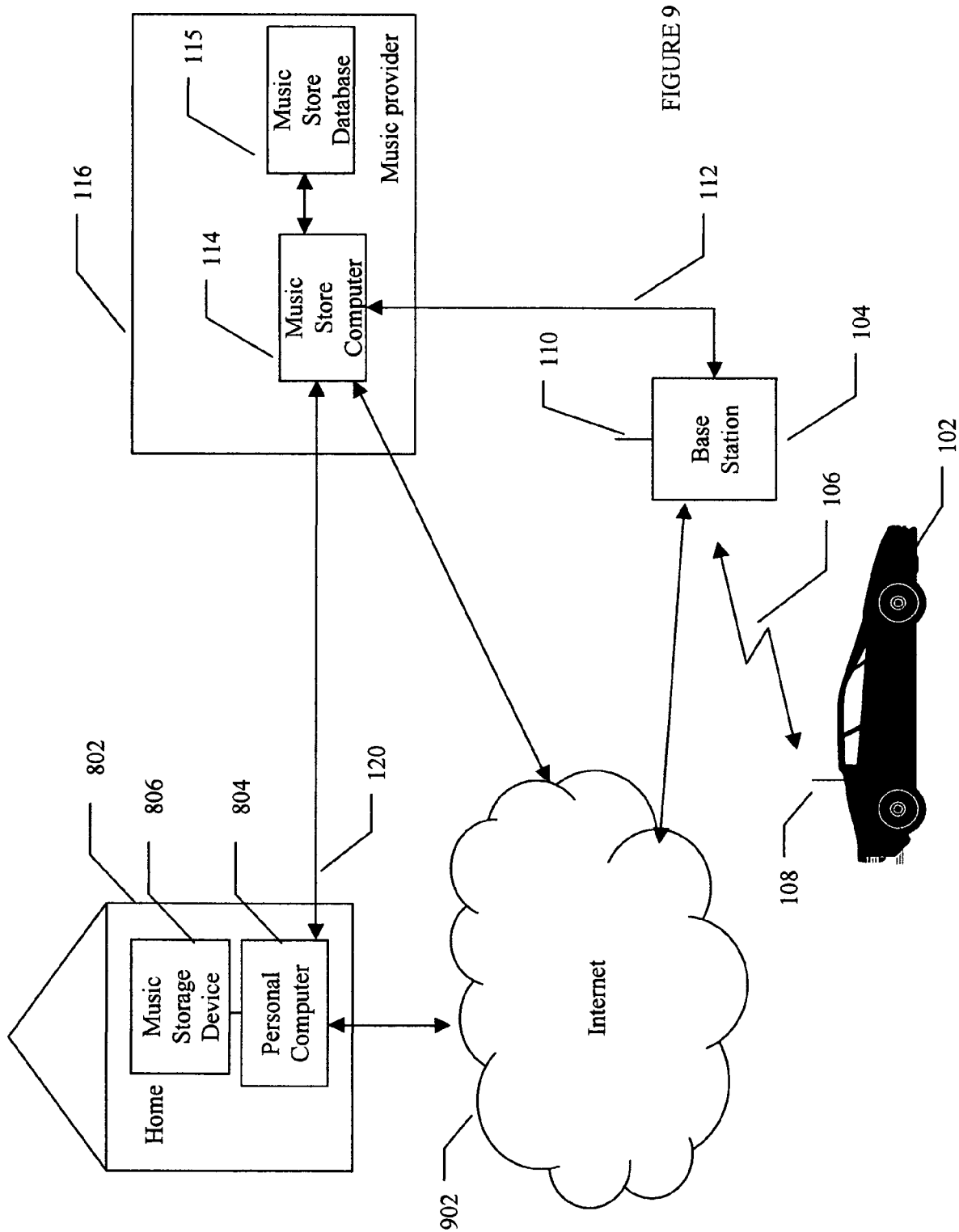
FIG. 9 is a schematic diagram of a system for transmitting the music over the Internet 808 to the subscriber's home.

The music storage apparatus illustrated in FIG. 2 need not be located in car 102. For example, the music storage apparatus can be located in the subscriber's home. FIG. 8 illustrates an embodiment of the present invention in which the storage apparatus for storing the data requested by the subscriber is located in a home 802 of the subscriber. In the embodiment shown in FIG. 8, the music is transferred to a computer 804 for storage on a music storage device 806. As described above, the music can also be sent over the Internet for storage in the subscriber's home. FIG. 9 is a schematic diagram of a system for transmitting the music over the Internet 808. Transmission over the Internet proceeds as described above. The music storage apparatus can be located anywhere else desired by the subscriber.

The foregoing disclosure of the preferred embodiments of the present invention has been presented for the purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may by varied and still remain within the spirit and scope of the present invention.

What is claimed is:

1. A system for storing music, comprising: an input device to receive a subscriber request to store music with a single button push while the subscriber is listening to the music without prior providing a list of potential song titles to the subscriber or relying upon Radio Data System data sent to the input device in a template format, and to generate a request from the single button push to obtain the music for storage in response to the subscriber request, wherein the request contains a timestamp of the when the button was pushed; a transmitter to transmit the request to obtain the music for storage from a database queried to obtain music responsive to the request to obtain the music for storage without relying on a sample of the music to identify the music; and a subscriber storage device that is physically accessible by the subscriber to receive the music from the database and store the music received from the database to allow playback by the subscriber a plurality of times without depletion of the stored music.

2. The system recited in claim 1, wherein the storage device is located in a vehicle in which the subscriber is located.

3. The system recited in claim 2, wherein the storage device is one of a CD-ROM, a DVD and a RAM.

4. The system recited in claim 1, wherein the storage device is located in a telephone and the music is transmitted in a ring tone format for storage as a ring tone in the telephone.

5. The system recited in claim 4, wherein only a portion of the music is stored in the telephone.

6. The system recited in claim 4, wherein the telephone is a cellular telephone.

7. The system recited in claim 1, further comprising a music play list comprising a list of songs that are played, wherein when the subscriber makes the request for storing the music, the music play list is consulted to determine which music is being played at the time of the request.

8. The system recited in claim 1, wherein the music database is provided by a third party.

9. The system recited in claim 1, wherein the subscriber is billed to store the music.

10. The system recited in claim 9, wherein the subscriber is billed to store the music on a per-use basis.

11. The system recited in claim 9, wherein the subscriber is billed to store the music on a periodic basis.

12. The system recited in claim 9, wherein the subscriber prepays to store the music.

13. A method for storing randomly selected music on demand, comprising: receiving an indication from a subscriber with a single button push to store music that the subscriber is listening to without prior providing a list of potential song titles to the subscriber or relying upon Radio Data System data sent to the input device in a template format; generating a request to obtain the desired music in response to the single button push, wherein the request contains a timestamp of the when the button was pushed; transmitting the request to obtain the desired music from a music storage database without relying on a sample of the music to identify the music; receiving a music file comprising the music desired to be stored for storage in subscriber equipment that is physically accessible by the subscriber in response to the request; and storing the received music file in the subscriber equipment such that the stored music can be played back by the subscriber a plurality of times without depleting the stored music.

14. The method recited in claim 13, further comprising detecting the push of a button to receive the indication from the subscriber.

15. The method recited in claim 13, further comprising:
transmitting the request to a music provider having a music database; and
receiving the music from the music provider in response to the request.

16. The method reciting in claim 13, further comprising:
transmitting the indication to a third party music provider; and
receiving the music from the third party music provider.

17. The method recited in claim 13, further comprising identifying the music that is desired to be stored by consulting a play list.

18. The method recited in claim 13, further comprising reformatting the music prior to storing it.

19. The method recited in claim 18, further comprising reformatting the music in accordance with the storage device prior to receiving the music for storage.

20. The method recited in claim 13, further comprising reformatting the music in accordance with the storage device after receiving the music for storage.

\* \* \* \* \*